3,398,210
COMPOSITIONS COMPRISING ACRYLOXYAL-
KYLSILANES AND UNSATURATED POLY-
ESTER RESINS
Edwin P. Plueddemann and Harold A. Clark, Midland,
Mich., assignors to Dow Corning Corporation, Midland,
Mich., a corporation of Michigan
No Drawing. Continuation-in-part of applications Ser.
No. 87,101, Feb. 6, 1961, and Ser. No. 111,146,
May 19, 1961. This application June 17, 1963, Ser.
No. 288,525
1 Claim. (Cl. 260—827)

ABSTRACT OF THE DISCLOSURE

Composite articles of improved strength are obtained either (1) by treating a base member or filler with an acryloxyalkylsilane or hydrolysis product thereof, curing the silane and thereafter applying a resin to the treated member, or (2) adding the silane to the resin and then applying the curable mixture to the base member or filler. As an example, laminates of glass fibers and polyester resins are prepared having improved bonding between the glass and the resin by employing these acryloxyalkylsilanes.

---

This application is a continuation-in-part of applicants' copending application Ser. No. 111,146, filed May 19, 1961, and now abandoned, which in turn is a continuation-in-part of their application Ser. No. 87,101, filed Feb. 6, 1961, now abandoned.

It is the primary object of this invention is provide improved molded articles of superior strength, particularly those made from resins containing aliphatic unsaturation and siliceous base members. Another object is to provide novel combinations of the above silanes and vinylic resins [1] which form superior molded articles. Other objects and advantages will be apparent from the following description.

This invention relates to composite articles comprising (1) a base member on the surface of which is a hydrolyzate of a compound of the formula $$CH_2=CRCOO(R')_a-R''SiX_3$$

in which R is a methyl radical or a hydrogen atom; R' is a divalent group composed of carbon, hydrogen, and oxygen, the latter being in a configuration selected from the group consisting of ether linkages and hydroxyl groups, in R' the ratio of carbon atoms to oxygen atoms being not greater than 3 to 1 and R' being attached to both the COO and the R'' groups through CO linkages; $a$ has a value of 0 or 1; R'' is an alkylene radical of from 1 to 4 carbon atoms and X is a monovalent hydrolyzable group and (2) a cured vinylic resin.

For the purpose of this invention R can be either hydrogen or a methyl radical, thus it is obvious that the term "acryloxy" as employed herein includes "methacryloxy" compounds.

The silanes employed in this invention are of two types; namely, those of the formula $$CH_2=CRCOOR''SiX_3$$

and those of the formula $CH_2=CRCOOR'-R''-SiX_3$. It is believed that the beneficial characteristics of the silanes of this invention reside in the acryloxy group at one end and the trifunctional silicon atom at the other. Thus, the purpose of R and R'' is to provide stable bridges connecting the acryloxy group to the silicon atom.

[1] The term "vinylic resin" as employed herein means resins which are polymerizable via aliphatic C=C groups. The term includes both monomers and polymers containing this group.

For the purpose of this invention R'' is any alkylene radical of from 1 to 4 carbon atoms such as methylene, ethylene, propylene, butylene and isobutylene.

For the purpose of this invention R' is an oxygenated radical in which the carbon to oxygen ratio is not greater than 3 to 1. This is for the purpose of maintaining the water solubility of the silane hydrolyzates as will hereinafter be discussed. Thus, it can be seen that R' can be an ether radical such as (—CH$_2$CH$_2$O—), $$(-CH_2CH_2O-)_{50}$$

$$[(-CH_2CH_2O-)_{40}(-C_4H_8O-)_{10}]$$

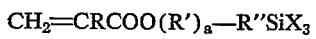

$$\begin{bmatrix} (CH_2OH)_2 \\ -CH_2CCH_2O- \end{bmatrix} \text{ and } (-CH_2CCH_2O-)$$

For the purpose of this invention X can be any monovalent hydrolyzable group. The term "hydrolyzable group" as employed herein means that the X group reacts with water under the normal conditions for hydrolyzing silanes. Thus X can be, for example, any halogen such as chlorine, bromine, iodine or fluorine, any group containing a silicon nitrogen bond such as Me$_2$N—, or Et$_2$N; any monovalent hydrocarbonoxy group such as methoxy, ethoxy, butoxy, isopropoxy, —CH$_2$CH$_2$OH, or radicals of the formula —(CH$_2$CH$_2$O)$_n$Y where Y is an aliphatic hydrocarbon radical of 1 to 4 carbon atoms, phenoxy, cresyloxy and

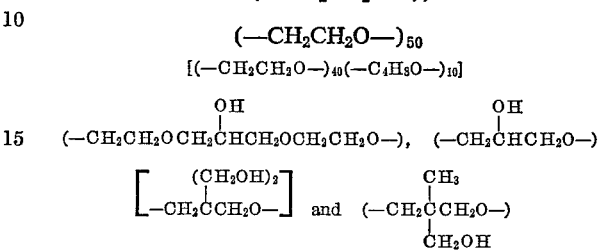

any acyloxy group such as acetoxy, formyloxy, prioionoxy; groups containing the silicon-oxygen-nitrogen bond such as Me$_2$C=NO— and Et$_2$C=NO— and any sulphate group such as

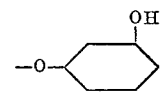

It should also be understood that hydrocarbon portions of X can be substituted with other radicals to give, for example, CF$_3$CF$_2$O—, CF$_3$COO—, Me$_2$NCH$_2$CH$_2$O—

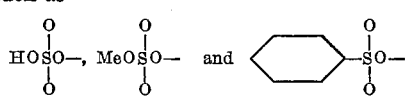

and NCCH$_2$CH$_2$O—.

Aqueous solutions of the hydrolyzates of the above silanes will often be the most commercially desirable form in which to use these products and the use of aqueous solutions to treat the base member is accordingly an important modification of the invention. The precise molecular configuration of the organosilicon compound in these aqueous solutions is not determinable. However, it is apparent that they represent highly hydroxylated silanols and siloxanols. When these aqueous solutions are prepared from silanes where the HX by-product is a neutral compound, the water solutions can be prepared by merely mixing the silane with water. However, in those cases where HX produces a strongly acidic or a strongly basic solution it is desirable to buffer the solution so as to bring the pH close to the neutral point. This will render the aqueous solution stable and hence more useable.

As stated above, one of the primary objects of this invention is to provide composite articles of improved strength. This strength is believed to be due to improved adhesion between the base member or filler and the vinylic resin. These articles can be prepared in two general ways. One way is to first treat the base member or filler with the above silanes or their hydrolysis products, cure the silane and thereafter apply the resin to the treated base member. An alternative method is to first add the silane to the vinylic resin and thereafter apply the mixture to the base member or filler.

In the latter method, best results are obtained when the silane is employed in amount of from .05 to 5 percent, preferably from .1 to 2 percent by weight based on the weight of the vinylic resin. It is believed that the silanes can be first added to the resin because when the resin is mixed with the base member or filler, the silane tends to migrate to the surface of the filler and thereby acts as a coupling agent when the composite article is cured.

The first method supra for making the articles involves treating (i.e., priming or coating) base members by wetting at least a portion of the base member with the defined silanes, either as such or in hydrolyzed form. Ordinarily, the treated surface will then be allowed to dry, and this can be done at ordinary temperatures or can be accelerated by the use of elevated temperatures, reduced pressures, or both. The preferred method is to wet the surface with an aqueous solution of a hydrolyzate of the defined silane. The optimum concentration of such a solution will depend upon the nature of the surface to be treated, the effects desired in regard to altering the characteristics of that surface, and the particular technique employed in applying the solution to a particular surface. Organic solvents such as benzene, toluene, xylene, mineral spirits, methanol, ethanol, isopropanol, and chlorinated hydrocarbons can be used to provide diluted solutions of the silane, but cost and safety factors make aqueous solutions preferable, except in situations where water does not "wet" the material to be treated as well as an organic solvent does. Wetting agents or water-miscible organic solvents (such as the lower aliphatic alcohols, acetone, and tetrahydrofuran) can be used in conjunction with water to improve the wetting characteristics of the aqueous solutions, and such modified solutions are intended to be within the scope of the term "aqueous solution" as used herein.

The primary object in treating base members as above and of adding the silanes or their partial hydrolyzates to the resin is to improve the bond obtainable between such members and various polymerizable materials containing aliphatic unsaturation in the uncured state. Thus, the base members of greatest interest are those in which bonding of this type is of importance. Examples are metallic and siliceous materials which are to be coated, impregnated, laminated, or the like, or to which other materials are to be adhered by means of an adhesive which is one of the aforesaid polymerizable materials. It is to be understood that the base members include materials of small particle size, in which case bonding strength is important because it affects the properties obtainable from articles in which the small particles are present as fillers and the like. The base members also include material in the form of felted or woven cloths and textiles, as well as all types of shaped solids, sheets, films, and fibers. In addition to siliceous and metallic materials, the base members can be composed of such diverse materials as the metal oxides, organic plastics, organosiloxane resins and rubbers, and natural and synthetic organic rubbers, and cellulosic products. At the present, the greatest improvements have been found in the treatment of siliceous materials.

The siliceous materials which are employed herein include all siliceous materials, but the invention is of particular interest with respect to those which are to be employed with organic resins or rubbers having aliphatic unsaturation in the uncured state, when used in such a way that bonding between the siliceous material and the resin or rubber is desired. The siliceous materials include mica, clay, and other silicate minerals such as asbestos, as well as vitreous enamel and ceramic surfaces, quartz and the many varied forms of finely divided silica such as diatomaceous earth, ground quartz, silica aerogel, and fume silica. One of the most important siliceous materials to be treated in accordance with this invention is glass, and this can be in sheets, fibers, or shaped forms thereof.

This invention is inclusive of articles which comprise any base member, at least one surface of which or at least a portion of which has been treated as above described. The articles of primary interest are those containing treated siliceous materials. Such treated siliceous materials have altered surface characteristics as evidenced by the improved bonding obtained between the treated surface and any polymerizable organic materials such as organic resins and rubbers containing aliphatic unsaturation in their uncured state. One of the most important manifestations of this improved bonding is found in the greatly improved strength of resinous and rubbery structures, such as molded or laminated articles and the like, in which the treated siliceous material is impregnated with the aforesaid polymerizable organic material.

The resinous and rubbery structures of this invention are produced by any of the conventional techniques for manufacturing such structures. In essence, the siliceous material is contacted with the chosen polymerizable material, which can then be polymerized to whatever degree may be desired, ranging from partial polymerization to produce "pre-preg" type materials to complete polymerization to produce finished articles. Molding compounds and the like can be produced by merely mixing the treated siliceous material into an appropriate resin or rubber.

Organic resins and rubbers containing aliphatic unsaturation in the uncured state are well known materials, and any of such materials can be used in practicing the present invention. The benefits of the invention are particularly applicable to resins. The term "resin" is used herein in the conventional broader sense as being inclusive of materials which may not be resinous in their uncured or monomeric state, so long as they are used in a form which is polymerizable to a resinous state.

The preferred vinylic compounds used herein embrace any polymerizable or copolymerizable compound containing the

radical, i.e. a vinylic type group in a terminal position in the molecule. The vinyl group or substituted vinyl group can be attached to any other substituents as long as the resulting compound is one which is polymerizable. The polymerizable vinylic compounds are well known in the literature. It is to be understood, however, that the term "polymerizable" as employed herein, and as generally used in the art of organic polymers, does not necessarily mean that the compound must be one which can polymerize with itself. In other words, it includes vinylic compounds which can only copolymerize with other vinylic compounds.

When the vinyl radical is attached to a benzene ring the reactant is of course styrene, when it is attached to a cyanide radical the reactant would be acrylonitrile. It can also be attached to carbon atoms which are themselves attached to other substituents as in the methacrylates or allyl derivatives such as diallylphthalate, triallylcyanurate, and the like, or the vinylic radical may be attached to a mere hydrocarbon chain of some sort as in isoprene. Thus it can be seen that the term "vinylic" is used herein even though the vinyl group forms a mere portion of a larger radical in a manner such that the entire compound itself would or could be given a name which does not employ the prefix "vinyl."

The vinylic compounds which can be employed in this invention fall within 5 general types. These vinylic compounds can be defined as follows:

(1) Compounds of the formula $CH_2=CHX$ where X is chlorine or one of the radicals $—C_6H_5$, $—C_6H_4CH=CH_2$, $—CH_6H_3Cl_2$, $—CN$, $—OOCCH_3$

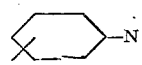

carbazolyl, —COOR³, and —OR³ where R³ is a lower alkyl radical, e.g. of 1 to 8 inclusive carbon atoms. Thus the defined formula represents the compounds vinyl chloride, styrene, divinylbenzene, dichlorostyrene, acrylonitrile, vinyl acetate, vinylpyridine, vinylcarbazole, alkylacrylates, and vinylalkyl ethers respectively. Preferably the R³ radicals are methyl or ethyl radicals.

(2) Compounds of the formula $CH_2=CYZ$ where Y and Z are either Cl or $CH_3$ radicals, or where Y and Z are H or $CH_3$. This formula represents the compounds vinylidene chloride, isobutylene, propylene, ethylene and isopropenyl chloride.

(3) The lower alkyl methacrylates, particularly the methyl and ethyl methacrylates.

(4) Compounds of the formula $CH_2=CQCH=CH_2$ where Q represents H or Cl atoms or the $CH_3$ radical. This formula represents the compounds butadiene, chloroprene, and isoprene.

(5) Linear unsaturated polyesters.

It will be obvious that because of volatility or other handling problems many of the above described vinylic compounds are not ordinarily applied in their monomeric state to base members when coating, impregnating, laminating, or molding such materials to prepare fabricated forms thereof. Where use of the vinylic compounds as such is not feasible for such reasons, or is not the ordinary practice, obviously the partially polymerized or partially copolymerized forms of the vinylic compounds will be employed. It is just as obvious that the completely polymerized forms of such polymers and copolymers would not be used, for they must be applied to the treated base member when they are still soluble in a carrier solvent or still liquid or fusible and hence operative as coating, impregnating, laminating, or molding resins or rubbers. In other words, the polymers or copolymers will be contacted with the treated material when they still retain at least some of the residual aliphatic unsaturation upon which they rely for further polymerization to the solid state. This aspect of the invention therefore merely represents conventional coating, impregnating, laminating, or molding practices.

Resinous or rubbery polymers and copolymers of the above described vinylic compounds are well known materials. Those of greatest interest here are styrene, the acrylic, methacrylic, and polyester resins, and butadiene-styrene copolymers. It is to be understood that the vinylic compounds above have been grouped into general types merely for convenience in describing them. The copolymers useful herein can contain different polymeric units from any one general type or from two or more different types, and, as is well known, innumerable combinations of these various units are possible.

The treated materials of this invention can also be advantageously coated with or incorporated into natural polyolefinic rubber articles, as, for example, those prepared from *Hevea braziliensis,* gutta balata, and gutta percha rubbers. Other types of resinous or rubbery materials which can be employed are organosiloxane rubbers and resins which contain at least some silicon atoms to which are attached unsaturated aliphatic radicals (particularly vinyl or allyl radicals), and resins which are copolymers of organosiloxane units and units derived from the above described vinylic compounds, so long as said copolymers retain some residual aliphatic unsaturation. Organosiloxane rubbers and resins of the described type have been amply described in the literature.

An outstanding example of the benefits obtainable from treating siliceous material in accordance with this invention is found in the preparation of laminates and the like from treated glass fiber and polyester resins. The improved bonding between the glass and the resin results in articles having greatly improved flexural and compressive strength, and greatly improved retention of such strength when the articles are exposed to water. This improvement in the properties of articles fabricated from polyester resins is sufficient to up-grade this relatively inexpensive type of resin so that it has properties equal to or better than those obtainable from the relatively expensive epoxy resins.

The unsaturated polyester resins are a well known class of materials. In general, they are the reaction products of alpha-beta ethylenically unsaturated dicarboxylic acids or anhydrides thereof with at least one polyhydric alcohol (ordinarily a dihydric alcohol, i.e., a glycol). Typical acids which can be employed in producing such resins include maleic, fumaric, itaconic, citraconic, mesaconic and acontic acids, and maleic and citraconic anhydrides. Examples of suitable polyhydric alcohols include ethylene glycol, propylene glycol, neopentalene glycol, and diethylene glycol (i.e., 2,2'-dihydroxyethyl ether). Higher boiling alcohols which are sometimes used in place of or in conjunction with these glycols include compounds such as 2,2-bis-(p-hydroxyethoxyphenyl)propane;
2,2-bis-(p-hydroxyethoxyethoxyphenyl)propane;
2,2-bis-(p-hydroxypropoxyphenyl)propane, and
2,2-bis-(p-hydroxyethoxybiphenyl)propane.

As is well known, the dicarboxylic acids listed above can be partially replaced in the polyester formulation by other dibasic acids, exemplified by adipic, succinic, sebacic, phthalic, isophthalic, terephthalic, and tetrachlorophthalic acids and anhydrides, any of which are typically employed in amounts up to 3 moles per mole of the alpha-beta unsaturated dibasic acid. Another typical modification of the polyester resins which can be employed herein is the acid half-ester reaction product of at least one polyhydric alcohol ester of an hydroxylated unsaturated fatty acid (such as castor oil) with the aforesaid unsaturated dicarboxylic acids or anhydrides. Esters of, for example, ricinoleic acid and ethylene or propylene glycol or glycerine and the like can of course be used to replace part or all of the castor oil in the latter modification.

The preferred polyester resins can be defined as comprising an esterification product of an alpha-ethylenic, alpha, beta-dicarboxylic acid with a glycol, said product being an advanced linear polyester containing unesterified carboxyl groups and preferably having an acid number of from 5 to 100. As is well known, the linear polyester is ordinarily employed in admixture with a liquid monomeric unsaturated polymerizable compound, and hence the polyester should be miscible with and copolymerizable with said monomeric compound to yield a solid resinous material. Typical formulations of such mixtures range from 50 to 80 percent by weight of the polyester, and from 20 to 50 percent of the liquid monomeric compound. The liquid monomeric unsaturated compounds have the group $>C=C<$ in their molecular structure, and are exemplified by compounds such as styrene, vinyl toluene, alpha-methylstyrene, divinylbenzene, 2,4-dichlorostyrene, vinyl acetate, methyl methacrylate, ethyl acrylate, diallyl phthalate, diallyl succinate, diallyl maleate, acrylonitrile, methylvinyl ketone, diallyl ether, methallyl alcohol, allyl crotonate, 1,3-chloroprene, butyl methacrylate, allyl acrylate, and triallyl cyanurate. Mixtures of two or more of these monomers can also be used.

The term "polyester resin" as used herein is intended to include the mixture of the linear polyester with the liquid monomeric unsaturated polymerizable compound as described above. The term also includes the polyester and the aforesaid mixture as conventionally used in conjunction with a polymerization catalyst and as used with other typical additives in such systems, as, for example, polymerization inhibitors or accelerators.

The polymerization catalysts employed in polyester resin systems are well known, and can be generally defined as vinyl addition type polymerization catalysts. Any organic peroxide which will function as a free radical type polymerization initiator is operable. Examples include the acyl peroxides, e.g., the benzoyl-, para-chlorobenzoyl-, 2,4-dichlorobenzoyl-, and lauroyl peroxides and the like; hydroperoxides such as the t-butyl-, cumene-, and para-methane hydroperoxides; peroxy esters, e.g., di-t-butyl diperoxyphthalate, t-butyl peroxyacetate, etc.; alkyl peroxides such as di-t-butyl peroxide and dibenzyl peroxide; ketone peroxides such as methylethyl ketone peroxide and cyclohexanone peroxide; and other organic "per" compounds such as t-butyl perbenzoate and di-t-butyl diperphthalate. The catalysts are ordinarily employed in amounts ranging from about 0.1 percent to 2 percent by weight, based on the weight of the polyester resin formulation. Typical accelerators used in these systems include the well known "driers" such as cobalt naphthenate; azomethine compounds, and polyamino compounds having at least one terminal primary amino group, along with the aldehyde reaction products of the latter. Such accelerators are commonly used in amounts of from about 0.01 percent to 2 percent by weight based on the weight of the polyester resin formulation. Typical polymerization inhibitors employed to prevent unwanted premature polymerization in the system are substituted phenols and aromatic amines, as, for example, hydroquinone, resorcinol, sym. alpha, beta-naphthyl diamine, and p-phenylene diamine, and amounts of from about 0.01 percent to 0.1 percent are generally sufficient.

The catalysts, accelerators, and inhibitors described above with respect to the polyester resin systems are also often employed with many of the other polymerizable organic materials containing aliphatic unsaturated in the uncured state. Of course, many other catalysts are known for the resinous and rubbery polymers and copolymers which have been described above, and the present invention contemplates the use of any of such catalysts, for the invention does not lie in the selection of any particular polymer-catalyst system.

After the polymerizable organic material is applied to the treated base member or added to the resin and the base member is then contacted with the mixture, the resulting composite mass is subjected to vinyl polymerizing conditions to bring about the degree of curing desired in that mass. The vinyl polymerizing conditions include the use of heat alone, use of ionizing radiation, and use of the various vinyl polymerization catalysts. In addition to the organic peroxides described above, typical catalysts include inorganic peroxides such as hydrogen peroxide and sodium peroxide, ozone, ammonium persulfate, potassium permanganate, and other "free radical generators" such as the azo compounds containing tertiary carbon atoms attached to each nitrogen atom of the azo linkage and in which the remaining valences of the tertiary carbon are satisfied by nitrile radicals, carboxyalkyl radicals, cycloalkylene radicals, alkyl radicals, and radicals of the formula YOOC— where Y is an alkyl radical. The compound α,α'-azodi-iso-butyronitrile is an example of a preferred type of azo compound.

No meaningful range of curing times and temperatures can be set forth for the many systems of polymerizable materials and catalysts contemplated here, for innumerable optimum conditions exist, depending upon the system used. Appropriate curing conditions for these various systems are well known, and range from room temperature to any elevated temperature below the decomposition point of the resin or rubber employed.

The alkoxysilanes employed in this invention can be prepared by several basic methods. One of these involves compounds in which R″ has from 2 to 4 carbon atoms. This method involves the addition reaction of a compound of the formula

where R″₁ is an unsaturated radial such as vinyl, allyl, methallyl or butenyl, with HSiX₃. These addition reactions are best carried out in the presence of platinum catalyst such as platinum deposited on alumina and chloroplatinic acid. The reaction temperatures are in the region of 50 to 115° C. The platinum is best employed in a concentration of about 1×10⁻⁴ moles per mole of unsaturated reactant.

Specific examples illustrating the above reactions are:

(1) CH₂=CHCOOCH₂CH=CH₂+HSiCl₃→
  CH₂=CHCOO(CH₂)₃SiCl₃
(2) CH₂=C(Me)COOCH₂CH=CH₂+HSi(OEt)₃
  CH₂=C(Me)COO(CH₂)₃Si(OEt)₃
(3) CH₂=C(Me)COO(CH₂CH₂O)₄CH₂CMe=
  CH₂+HSi(OAc)₃→CH₂=C(Me)COO(CH₂
  CH₂O)₄CH₂CH(Me)CH₂Si(OAc)₃
(4) CH₂=CHCOOCH=CH₂+HSi(OCH₂CH₂
  OMe)₃→CH₂=CHCOOCH₂CH₂Si(OCH₂CH₂OMe)₃

The symbols Me, Et, and Ac have been used above and will be used throughout this specification as representative of methyl, ethyl, and acetyl radicals respectfully. If desired, one can carry out the addition reaction employing HSiX₃ and thereafter exchange the X radicals in the resulting silanes for other X radicals. Thus, for example, the chlorosilane shown above can be reacted with methanol to produce the corresponding trimethoxysilane. Alternatively, the chlorosilane can be reacted with the salt of an acid such as sodium acetate or sodium benzoate to prepare the corresponding triacetoxy or tribenzoyloxysilane. Again the triethoxysilane shown above can be refluxed with a high boiling alcohol such as beta-methoxyethanol to produce the tris-(beta-methoxyethoxy)silane. In such an interchange ethanol would be evolved.

A second general method of preparing the silanes employed in this invention is to first prepare an epoxysilane of the formula

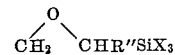

These compounds are prepared by reacting unsaturated epoxides of the formula

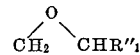

with silanes of the formula HSiX₃. In carrying out this reaction, of course X must be a radical which is unreactive toward the epoxide group. This includes alkoxy and acyloxy silanes, in which the alkoxy and acyloxy groups are free of active hydrogen. The resulting addition product is then reacted with an hydroxy ester of acrylic or methacrylic acid such as for example, beta-hydroxyethoxymethacrylate. This reaction is carried out in the standard method for reacting alcohols with epoxides and is generally done by employing catalysts such as stannic chloride and temperatures in the range of 50 to 100° C. An illustrative reaction is as follows.

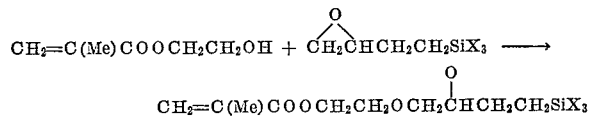

In carrying out any of the above reactions, it is desirable to employ polymerization inhibitors such as copper acetate and hydroquinone to prevent polymerization of the silane product by way of the acrylate double bond.

The third general method for preparing the silanes employed in this invention is especially applicable where R″ is a methylene radical. However, it can be used where R″ contains more than one carbon. This reaction entails reacting a tertiary amine salt of acrylic or methacrylic acid (the organic radicals attached directly to nitrogen in said salt being alkyl radicals of from 1 to 4 inclusive carbon atoms) with chloroalkylsilane of the formula

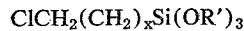

where x is 0, 1, 2, or 3. It will be seen that the products of this invention wherein R″ is methylene will be produced when $x$ in the above reactant is 0. Triethylamine is the preferred amine to form the reactant salt, and the salt as such does not necessarily have to be isolated. In other words, the amine and the chosen acid can be merely mixed, and the chloroalkylsilane added to the mixture in approximately stoichiometric quantities. Preferably the reaction is carried out in the presence of an inert organic solvent such as benzene, toluene, xylene, or cyclohexane, at reaction temperatures of about 100° to 150° C. It is also best to carry out the reaction in the presence of one or more polymerization inhibitors for acrylic or methacrylic acid, such as hydroquinone and N,N'-diphenylphenylene diamine. The reaction proceeds with the formation of the desired product $$CH_2=CRCOOR'_a-R''-Si(OR')_3$$

and the precipitation of the by-product tertiary amine hydrochloride. The chloroalkylsilane reactants can be prepared, for example, by the reaction of vinyl-, allyl-, or butenyl chloride with $HSi(OR')_3$, using chloroplatinic acid as the catalyst, or by the same reaction with $HSiCl_3$, followed by alkoxylation or acyloxylation of the chlorosilane adduct. The reactants of the formula $ClCH_2Si(OR')_3$ can be prepared by the chlorination of $MeSiCl_3$ to produce $ClCH_2SiCl_3$, followed by alkoxylation or acyloxylation of the latter.

In the preparation of aqueous solutions from the above organosilanes, the hydrolysis water is best employed at a pH of from 3 to 7 inclusive. At a pH of 7, however, a rather long time is required to reach the water soluble hydrolyzate stage, thus a pH of from 3.5 to 5 is preferred. Once the water soluble state is reached, it is immaterial whether any water used for further dilution is on the acid side. Preferably the hydrolysis water is made mildly acidic with a water soluble carboxylic acid such as acetic or propanoic acids. This aids in the hydrolysis of the (OR') groups, but does not bring about the more rapid and more complete condensation of silanol groups which will take place if a base or a stronger acid is used to expedite the hydrolysis. Such condensation is to be avoided because the resulting siloxanes and siloxanols will gel and precipitate out of the aqueous solution, i.e., the "shelf life" of the solution will be poor. In general, the best results are obtained by mixing the defined organosilanes with water which contains about 0.1 percent by weight of acetic acid. If desired, water miscible solvents can be added to the aqueous solution to improve its shelf life and wetting characteristics. The acetoxysilanes of this invention will, of course, provide their own acid upon contact with water.

In case one uses halosilanes or other silanes producing strong acids upon hydrolysis, it is necessary to buffer the hydrolysis solution to prevent gelation of the hydrolyzate. This is best done by adding a dilute solution of the silane in a water soluble solvent such as acetone, to dilute aqueous ammonia.

Base members can be treated with the organosilanes of this invention, or with solutions of such inorganic solvents, and in this case the water on the base member itself and/or atmospheric moisture or treatment with steam or other sources of water (with acidic or basic hydrolysis catalysts added if desired) can be relied upon to bring about hydrolysis of the organosilane. In such a case, the treated base member is then preferably heated to expedite the condensation of the hydrolyzate to produce a permanent, insoluble sizing or finish on the base member. Comparable results can be obtained by permitting the treated base member to stand for longer periods of time at room temperature. The fully condensed siloxane polymer which is ultimately formed on the base member consists essentially of siloxane units of the formula $$CH_2=CRCOOR'_a-R''-SiO_{1.5}$$

Another technique for treating a base member is by hydrolyzing or partially hydrolyzing the organosilanes with an amount of water which provides little or no excess over the theoretical amount necessary to form the $$-Si(OH)_3$$

compound (or which is insufficient for such complete hydrolysis), dissolving the resulting hydrolyzate or partial hydrolyzate in an organic solvent, and applying the solvent solution to the base member. This removes or reduces the need for any hydrolysis to take place on the base member itself. Condensation of the hydrolyzate is then allowed to take place by allowing the treated base member to stand at room temperature, or is expedited at elevated temperatures, as in the previously discussed treatment.

The use of aqueous solutions of the hydrolyzates of the defined organosilanes is generally preferred. The concentration of organosilicon hydrolyzate in the solution can vary over an extremely wide range, for example, from 0.1 to 90 percent, and optimum concentrations for treating base members will depend upon the nature of the base member and upon the use to be made of it, as well as upon the method of application. Even when a single type of base member is under consideration, the optimum concentration varies with the method of application. In the treatment of glass fiber, for example, the aqueous solutions are best used at a concentration of 5 to 10 percent when applied to the glass fiber as it is drawn at speeds up to 10,000 feet per minute out of a bushing in its manufacture. The typical method of application here is to keep a roller, moving belt, or pad moistened with the treating solution and to contact the fiber therewith as the fiber is drawn. Treating the fiber at this stage and at this concentration provides both lubrication and sufficient cohesiveness of the treated fibers to permit their being twisted into threads, strands, or roving. This eliminates the need for the use of conventional organic lubricating and bonding agents, and at the same time provides a glass fiber having an enhanced ability to bond to polymerizable materials. In contrast, when woven glass fiber cloth is being treated, a concentration of only 0.25 to 1.5 percent is generally sufficient to produce the desired results, for the relatively long contact time of the typical spraying or dipping operation permits a greater amount of the solution to be picked up. The concentrations of the aqueous solutions referred to above are in terms of the weight percent of the unhydrolyzed monomeric organosilane used in the preparation of the solution, based upon the weight of that solution.

In the treatment of glass cloth or other forms of glass fiber by any of the above techniques, it is preferable to operate in a manner such that the theoretical pickup of organosilicon compound, calculated as $$CH_2=CRCOO-R'_a-R''-SiO_{1.5}$$

ranges from about 0.1 to 0.75 percent by weight based on the weight of the glass. Any attempt to give comparable pick-up figures for base members in general is meaningless, however, because of the vast variation in the ratio of treated surface area to weight in the many diverse types of base members whose treatment is contemplated here. In general, the siloxane "coatings" produced on base members in the treatment of this invention will be too thin to be visible, i.e., no obvious tangible film will be produced, and in fact the film can range down to that of a monomolecular layer. If desired, however, a thick tangible layer can be built up by using more concentrated forms of treating solutions or by repeated applications, or by using partially polymerized hydrolyzates.

In the treatment of base members it is preferred that said members be relatively free of any surface contaminations such as oil, grease, or dirt. In the treatment of glass fiber, it is preferred that the fiber be free of any organic lubricating agents, bonding agents, or the like which may have been employed in its manufacture. Clean glass fiber, glass cloth, etc. are commercially available materials, an example being the "heat-cleaned glass cloth"

which is produced by literally burning the organic agents off of the glass at elevated temperatures.

The following examples are illustrative only. The symbols Me, Et, i-Pr, Bu and Ac have been used to represent methyl, ethyl, isopropyl, butyl and acetyl radicals respectively. All parts and percentages mentioned are by weight.

Example 1

A mixture of 1,000 ml. toluene, 12 g. 2,5 - ditertiarybutyl hydroquinone, 61 g. (0.5 mole) $HSi(OMe)_3$, and 10 g. of a solution of $H_2PtCl_6 \cdot 6H_2O$ in methylbenzoate (said solution containing 1 percent by weight Pt) was heated to 105° C. and a mixture of 427 g. (3.5 moles) $HSi(OMe)_3$ and 504 g. (4 moles) allylmethacrylate was added thereto over a period of about 1.5 hours. The exothermic reaction taking place during this addition maintained the temperature at about 105° C. The reaction mass was heated for one hour at 110° to 112° C., cooled, and 10 g. hydroquinone and 5 g. 2,5-ditertiarybutyl hydroquinone added thereto. Volatiles were stripped off and the residue was distilled through a 12 inch Vigreaux column. The desired product $$CH_2=C(Me)COO(CH_2)_3Si(OMe)_3$$

was distilled off at 100° C. to 110° C. at 5 mm. Hg pressure. Redistillation of the product cuts through the Vigreaux column showed a boiling range of 94° to 96° C. at 1 mm. Hg $n_D^{25}$ 1.4305.

Example 2

A mixture of 200 ml. toluene, 0.5 g. 2,5-ditertiarybutyl hydroquinone, 12.2 g. $HSi(OMe)_3$, and 0.6 g. of the $H_2PtCl_6 \cdot 6H_2O$ solution of Example 1 was heated to 110° C. and a mixture of 122 g. (1 mole) $HSi(OMe)_3$ and 112 g. (1 mole) allylacrylate was added thereto over a period of about 2 hours, the temperature being thus maintained at 110° to 114° C. After the addition was complete, the reaction mass was heated 1 hour at 106° to 114° C., cooled, and 0.5 g. 2,5-ditertiarybutyl hydroquinone added thereto. After stripping off volatiles, the residue was distilled through the 12 inch Vigreaux column to give the product $CH_2=CHCOO(CH_2)_3Si(OMe)_3$, boiling at 65° to 70° C. at 0.1 mm. Hg pressure, $n_D^{25}$ 1.4155.

Example 3

When the compounds $HSi(OEt)_3$, $HSi(Oi-Pr)_3$, $HSi(OAc)_3$, $HSi(OCH_2CH_2OBu)_3$, or $$HSi(OCH_2CH_2OMe)_3$$

are substituted for $HSi(OMe)_3$ in the reactions of Examples 1 and 2, the products obtained correspond to those of said examples with (OEt) groups etc. attached to the silicon atom in place of the (OMe) groups.

Example 4

When vinyl methacrylate is used in place of allylmethacrylate in the process of Example 1, the compound $CH_2=C(Me)COO(CH_2)_2Si(OMe)_3$ is produced.

Example 5

$MeSiCl_3$ was chlorinated to produce $ClCH_2SiCl_3$. The latter was reacted with methanol to produce $$ClCH_2Si(OMe)_3$$

When a solution of 1 mole triethylamine, 1 mole methacrylic acid, 15 parts hydroquinone, 300 parts xylene, and 0.9 mol $ClCH_2Si(OMe)_3$ is heated at reflux for 16 hours, filtration and distillation of the reaction mass yields the product $CH_2=C(Me)COOCH_2Si(OMe)_3$.

Example 6

A mixture of 1 part $CH_2=CHCOO(CH_2)_3Si(OMe)_3$ and 20 parts 0.1 percent acetic acid in aqueous solution was agitated slightly to form an homogeneous solution of the resulting hydrolyzate, then 179 parts water was added to form a 0.5 percent solution based on the original organosilane. Glass cloth having the commercial designation "112" (i.e., "181" style glass cloth which had been heat-cleaned) was dipped in the 0.5 percent solution. The glass cloth picked up about 65 percent of its weight of the solution, representing a pick-up of about 0.23 percent calculated as $CH_2=CHCOO(CH_2)_3SiO_{1.5}$. The cloth was allowed to dry at room temperature, and was then heated 7 minutes at 230° F.

A laminate was prepared containing 14 plies of the treated glass cloth (laid up with the warp threads rotated 90° in alternate plies) impregnated with a polyester resin, the laminate being cured 30 minutes at 30 p.s.i. and 100° C. to form a molded sheet having a thickness of about 120 mils and containing about 30 percent by weight of the cured polyester resin. The resin employed was a solution of 70 parts linear polyester in 30 parts of styrene monomer, to which had been added 0.5 part benzoyl peroxide dissolved in about 7.5 parts styrene monomer. The linear polyester in this resin mixture was one prepared from phthalic acid and maleic acid in equimolar proportions reacted with propyleneglycol, the 70 percent solution of this polyester in styrene having an acid number of about 35. The flexural strength of this laminate was determined in accordance with the U.S. Federal Specification L–P 406b-Method 1031, and compressive strength was determined in accordance with Method 1021 of that Specification. Flexural strength was also determined on a sample of the laminate which had been boiled in water for 2 hour and then wiped dry, this being a test which is recognized as roughly the equivalent of standing in water at room temperature for one month. Results from the latter test will be referred to hereafter as the "2 Hr. Boil" data. The 2 Hr. Boil Flexural strength times 100 divided by the strength of the laminate as molded is the "Percent Retention." The following results were obtained on the laminate prepared above, the strengths being reported in p.s.i.

Flexural _____ 82,400
2 hr. boil _____ 76,200
Retention, percent _____ 93
Compressive strength _____ 44,900

For purposes of comparison, a laminate was prepared in the same way from the same polyester resin but the glass cloth employed was not treated with the organosilane. The test results were as follows:

Flexural strength _____ 50,700
2 hr. boil _____ 32,600
Retention, percent _____ 64
Compressive strength _____ 29,600

Example 7

A mixture of 1 part $$CH_2=C(Me)COO(CH_2)_3Si(OMe)_3$$

and 20 parts 0.1 percent acetic acid solution was agitated until homogeneous, then diluted with 179 parts additional 0.1 percent acetic acid. A sample of "112" heat-cleaned glass cloth was dipped in the solution, air-dried, and heated 7 minutes at 230° F. The treated glass cloth contained about 0.24 percent of its own weight of the organosilicon coating, calculated as $CH_2=C(Me)COO(CH_2)_3SiO_{1.5}$. Different laminates were prepared from this treated cloth, as follows:

(A) A laminate was prepared by the same technique and from the same benzoyl peroxide catalyzed polyester resin system as in Example 6. Test data showed the following results.

Flexural strength _____ 84,000
2 hr. boil _____ 85,200
Retention, percent _____ 102
Compressive strength _____ 53,300

The increase in strength after boiling the laminate for 2 hours indicates that the laminate as molded was not quite fully cured, and further curing took place during the boiling which more than offset any slight decrease in strength which may have been brought about by exposure to the water.

(B) A laminate was prepared by impregnating 14 alternated plies of the treated glass cloth with the polyester resin described in Example 6. In place of the benzoyl peroxide catalyst, however, a system which would cure at room temperature was produced by adding to the resin a double catalyst consisting of sufficient cobalt octoate to provide 0.03 percent Co in the resin, and 0.5 percent methylethyl ketone peroxide. The impregnated glass cloth was molded at room temperature for 24 hours under an initial pressure of 30 p.s.i., with stops set in the mold. The final laminate had a thickness of 123 mils. The laminate so produced was removed from the mold, given an after-cure in an oven at 140° F. for 6 hours, and tested with the following results.

Flexural strength _____ 96,000
2 hr. boil _____ 86,300
Retention, percent _____ 90
Compressive strength _____ 65,000

(C) Another room-temperature cured laminate was prepared by impregnating 14 alternated plies of the treated glass cloth with a polyester resin consisting of 75 percent of the linear polyester described in Example 6 and 25 percent methylmethacrylate. This resin contained 0.25 percent methylethyl ketone peroxide and 0.007 percent Co added as cobalt octoate. The impregnated assembly was molded 24 hours at room temperature as before, and then after-cured for 12 hours at 140° F. The laminate was 120 mils thick and had the following properties.

Flexural strength _____ 97,100
2 hr. boil _____ 85,500
Retention, percent _____ 88
Compressive strength _____ 61,400

(D) A solid, powdered linear polyester which is the fumaric acid ester of an alkylene oxide and bisphenol A (i.e., p,p'-isopropylidenediphenol) is marketed by the Atlas Powder Company as "Atlac 382." A solution was prepared containing 385 parts "Atlac 382" in 315 parts of styrene monomer. This solution was catalyzed with 1 percent benzoyl peroxide and used to impregnate 14 alternated plies of the treated glass cloth, which were then press molded as in Example 6. The resulting laminate was 105 mils thick and had the following properties:

Flexural strength _____ 100,000
2 hr. boil _____ 95,600
Retention, percent _____ 95.6
Compressive strength _____ 43,700

For the purposes of comparison, another laminate was prepared in the same way from the same resin, using glass cloth which had not been treated with the organosilicon compound, and this laminate had the following properties.

Flexural strength _____ 15,200
2 hr. boil _____ 14,400
Compressive strength _____ 11,200

(E) A solution was prepared of 66.5 parts of a resinous copolymer having a viscosity of about 3300 poises at 77° F. and being the reaction product of 4 moles butadiene and 1 mole styrene, in 66.5 parts of vinyl toluene, and 3.65 parts dicumyl peroxide and 3.65 parts di-t-butyl peroxide were added thereto. A laminate was prepared by impregnating 14 alternated plies of the treated glass cloth with this solution, and molding the assembly for 40 minutes at 175° C. and 30 p.s.i. This laminate had the following properties.

Flexural strength _____ 49,300
2 hr. boil _____ 47,400
Retention, percent _____ 96
Compressive strength _____ 21,000

For purposes of comparison, another laminate was prepared in the same manner but using glass cloth which had not been treated with the organosilicon compound. The test results were as follows.

Flexural strength _____ 12,600
2 hr. boil _____ 7,200

(F) A solution of 60 parts of a resinous copolymer having a viscosity of 4600 poises at 77° F. and being a copolymer of butadiene and styrene in a 4:1 molar ratio, 40 parts vinyltoluene, 2 parts dicumyl peroxide, and 2 parts di-t-butyl peroxide was used to impregnate 14 alternated plies of the treated glass cloth. The assembly was molded at 30 p.s.i. for 30 minutes at 300° F. and 30 minutes at 320° F., then removed from the press and post-cured 2 hours at 350° F. This laminate had a thickness of 130 mils and had the following properties.

Flexural strength _____ 54,600
2 hr. boil _____ 55,200
Compressive strength _____ 30,000

A laminate prepared in the same way from the same resin, but using untreated glass cloth, had a flexural strength of only 26,800; 2 hr. boil strength of 10,200; and a compressive strength of 9,600.

Example 8

A mixture of 15 parts

$$CH_2=C(Me)COO(CH_2)_3Si(OMe)_3$$

and 135 parts of 0.1 percent acetic acid was agitated until a homogeneous solution of the resulting hydrolyzate was obtained, and the solution was then diluted with 1350 parts 0.1 percent acetic acid to provide a 1 percent solution of the starting silane. Heat-cleaned 60-end glass fiber roving was passed through the solution and then through a curing tower in which air was circulated at 250° F., the speed of passage being such that the roving was heated for about 2.5 minutes. In this treatment the roving showed a pickup of about 0.45 precent of its weight of siloxane solids, calculated as

$$CH_2=C(Me)COO(CH_2)_3SiO_{1.5}$$

The treated roving was wound in parallel fashion around a metal frame in a manner to provide about 2.72 g. of glass per square inch. The assembly was impregnated with the polyester resin system of Example 6, and press molded 30 minutes at 30 p.s.i and 100° C. The resulting laminate was cut away from the metal frame and cut into test specimens the length of which ran parallel to the direction of the glass roving. Test results were as follows. (Note that a longer exposure to boiling water was used.)

Flexural strength _____ 176,500
24 hr. boil _____ 147,300
Retention, percent _____ 84

In contrast, laminates prepared in the same way from heat-cleaned glass roving which had not been treated showed the following properties.

Flexural strength _____ 130,000
24 hr. boil _____ 57,100
Retention, percent _____ 44

As another comparison, an additional laminate was prepared in the same way except that the glass fiber roving employed was a commercially treated roving in which vinyl substituted silanes are used as the treating agent. This roving represents the best of the hitherto available rovings insofar as the preparation of polyester laminates is concerned. The test results were as follows.

Flexural strength _____ 150,000
24 hr. boil _____ 93,500
Retention, percent _____ 62

Example 9

When $CH_2=C(Me)COO(CH_2)_3Si(Oi\text{-}Pr)_3$ or the corresponding $-Si(OAc)_3$ and $-Si(OCH_2CH_2OMe)_3$ compounds or $CH_2=C(Me)COOCH_2Si(OMe)_3$ or $$CH_2=CHCOO(CH_2)_4Si(OEt)_3$$

are used in place of the $-Si(OMe)_3$ compound in the treatment described in Example 7, and laminates then prepared as described in that example, comparable improvements in the strength of the laminates are obtained.

Laminates have been shown in the above examples because they illustrate so well the improvement in bond strength between a siliceous material and a polymerizable unsaturated material which can be brought about by this invention. It will be obvious that the improvement in bond strength will be equally important in many other usages, as, for example, in treating sheets of glass which will be used in sandwich structures such as safety glass; in treating glass, ceramics, vitreous enamel surfaces and the like which are to be given protective or decorative coatings of paints, enamels, or varnishes containing unsaturated resins, in treating glass fiber textiles which are to be colored by pigments dispersed in unsaturated resins such as the acrylic latex pigment bonding systems conventionally used for that purpose; in treating silica, titania, alumina, iron oxide, and other metal oxide fillers, as well as mica, asbestos, chopped glass, etc. to improve the reinforcement effect of such fillers in unsaturated resinous or rubbery articles; and in the treatment of metal surfaces such as steel, iron, and aluminum to improve the adhesion of protective and decorative coatings or of bodies of unsaturated resins and rubbers thereto. The treatment of steel and aluminum with the aqueous solutions of hydrolyzates described in Examples 6 and 7 has been found to provide a surface against which silicone rubber (such as that containing dimethylsiloxane and methylvinylsiloxane copolymer units) can be vulcanized to produce a bond to the metal which is stronger than the silicone rubber itself.

Example 10

One mole of allylmethacrylate containing 1 percent by weight hydroquinone was mixed with 100 p.p.m. platinum added as chloroplatinic acid and the mixture was heated to 70° to 80° C. as one mole of trichlorosilane was added. The product was heated one hour longer at 80° C. then distilled to give $CH_2=C(Me)COO(CH_2)_3SiCl_3$ boiling at 100° C. at 1 mm. and having a density at 25° C. of 1.238.

This material was applied to 181 glass cloth and washed and dried to give a weight pickup of .25 percent by weight of the glass. The primed glass cloth was laminated with the polyester resin as described in Example 6 and the cured laminate had the following properties:

Flexural strength _____ 86,800
2 hr. boil _____ 82,500
Retention, percent _____ 95
Compressive strength _____ 53,700

Example 11

A mixture of 150 ml. of benzene, .15 mole of $$CH_2=C(Me)COO(CH_2)_3SiCl_3$$

and .45 mole of alpha-picoline was cooled to 0° C. There was added thereto a solution of .6 mole of acetoxime in 200 ml. of benzene. The mixture was held at 5° to 10° C. for one hour and then heated to 55° to 60° C. The product was cooled and filtered free of alpha-picoline hydrochloride. The solvent was then removed from the filtrate to give the liquid compound $$CH_2=C(Me)COO(CH_2)_3SiON=CMe_2.$$

This product was dissolved in water to give a .6 percent by weight solution based on the weight of the corresponding siloxane and the solution was then used to impregnate 181 glass cloth and the resulting product laminated with the polyester resin as described in Example 6. The cured laminates had the following properties:

Flexural strength _____ 86,300
2 hr. boil _____ 79,175
Retention, percent _____ 92
Compressive strength _____ 47,700

Example 12

100 g. of methylmethacrylate and 125 g. of beta-(allyloxy)ethanol were dissolved in 140 g. of toluene and mixed with .5 g. of hydroquinone and 2 g. of concentrated sulfur acid. The mixture was refluxed for 6 hours as methanol was removed. The resulting ester was washed, dried, and distilled.

66 g. of the ester was mixed with 61 g. of trimethoxysilane, 73 g. of tetrahydrofuran, 1 g. of phenylbeta-naphthyl amine, .5 g. of hydroquinone and .10 g. of a one percent solution of chloroplatinic acid in alcohol. The mixture was warmed to 65° to 75° C. for two hours and then distilled to give the product $$CH_2=C(Me)COOCH_2CH_2O(CH_2)_3Si(OME)_3$$

having the following properties: B.P. 150° to 155° C. at 3 mm., $d_4^{25}$ of 1.057 and $n_D^{25}$ 1.4365.

The product was dissolved in water as shown in Example 6, and applied to 181 glass cloth as shown in that example. The resulting cloth was laminated with the polyester resin as shown in Example 6 and the cured laminates had the following properties:

Flexural strength _____ 97,600
2 hr. boil _____ 97,000
Retention, percent _____ 99
Compressive strength _____ 54,600

Example 13

13 g. of beta-hydroxyethylmethacrylate was dissolved in 13 g. of ethyleneglycol dimethylether. .01 g. of hydroquinone and 10 drops of stannic chloride were added thereto and then 23.6 g. of $$CH_2\!\!-\!\!\overset{O}{\overset{\diagup\diagdown}{\phantom{M}}}\!\!CHCH_2O(CH_2)_3Si(OMe)_3$$

was added as the mixture was cooled on a water bath held at 20° C. The mixture was then allowed to stand for one hour and the product was a water soluble fluid having the formula $$CH_2=C(Me)COOCH_2CH_2OCH_2\overset{OH}{\underset{|}{C}}HCH_2O(CH_2)_3Si(OMe)_3$$

This material was applied to 181 glass cloth and laminated as shown in Example 6 and the resulting cured laminates had the following properties:

Flexural strength _____ 84,200
2 hr. boil _____ 77,000
Retention, percent _____ 91
Compressive strength _____ 44,500

Example 14

The procedure of Example 13 was repeated except that 14.4 g. of beta-hydroxypropylmethacrylate was employed. The resulting product was a water soluble material having the formula $$CH_2=C(Me)COOCH_2CH(Me)OCH_2\overset{OH}{\underset{|}{C}}HCH_2O(CH_2)_3Si(OMe)_3$$

This product was applied to glass and laminated in accordance with the procedure of Example 6 to give the following properties for the cured laminates:

Flexural strength _____ 84,600
2 hr. boil _____ 81,200
Retention, percent _____ 96
Compressive strength _____ 49,300

Example 15

The composition $CH_2=C(Me)COO(CH_2)_3Si(OME)_3$ added as Pt on alumina the following products are obtained:

| Ester | Silane | Product |
|---|---|---|
| $CH_2=C(Me)COO(CH_2CH_2O)_{100}CH_2CH=CH_2$ | $HSi(NMe_2)_3$ | $CH_2=C(Me)COO(CH_2CH_2O)_{100}(CH_2)_3Si(NMe_2)_3$ |
| $CH_2=CHCOO[(C_2H_4O)_{25}(C_3H_6O)_{10}]CH_2CH=CH_2$ | $HSi(OCH_2CH_2Cl)_3$ | $CH_2=CHCOO[(C_2H_4O)_{25}(C_3H_6O)_{10}](CH_2)_3Si(OCH_2CH_2Cl)_3$ |
| $CH_2=C(Me)COOCH_2C(Me)=CH_2$ | $HSi\left(OOC-\text{}\right)_3$ | $CH_2=C(Me)COOCH_2CH(Me)CH_2Si\left(OOC-\text{}\right)_3$ |
| $CH_2=C(Me)COOCH_2C(Me)=CH_2$ | $HSi(OEt)_3$ | $CH_2=C(Me)COOCH_2CH(Me)CH_2Si(OEt)_3$ | was added to the polyester resin of Example 6 in the amounts shown below. Heat-cleaned 181 glass cloth was impregnated with the mixture. The impregnated glass was laminated and cured as shown in Example 6. The laminates had the following properties:

| Percent by wt. silane based on the glass | Flexural strength | 2 hr. boil | Percent retention | Compressive strength |
|---|---|---|---|---|
| 0.125 | 72,600 | 56,500 | 78 | 42,700 |
| 0.250 | 76,400 | 73,000 | 95 | 41,800 |
| 0.50 | 86,800 | 75,700 | 87 | |
| 0.75 | 76,600 | 72,400 | 95 | 37,400 |
| 1.0 | 86,400 | 80,200 | 93 | |
| 2.0 | 84,200 | 78,000 | 93 | 41,500 |

Example 16

One percent of $CH_2=C(Me)COO(CH_2)_3Si(OMe)_3$ was added to styrene monomer. The mixture was polymerized with benzoyl peroxide in contact with glass. The resulting polymer adhered tenaciously to the glass giving adhesion equivalent to that obtained with epoxy resins.

Example 17

.5 percent by weight of $$CH_2=C(Me)COO(CH_2)_3Si(OMe)_3$$

was added to a commercial methylmethacrylate lacquer. The mixture was applied to glass panels and the panels were air dried 24 hours and then heated 1 hour at 250° F. The adhesion was excellent. The panels were then submerged in water at 25° C. for one hour. The adhesion was still excellent. By contrast when the glass was coated with the methacrylate lacquer alone, cured as above and submerged in water one hour at 25° C. the adhesion was poor.

Example 18

When the following acrylic esters are reacted with the following silanes in the presence of 100 p.p.m. platinum

Example 19

When the ester $CH_2=C(Me)COO(CH_2CH_2O)_{100}H$ is reacted with the silane

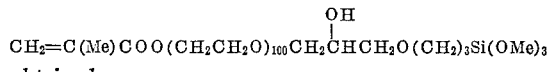

in accordance with the procedure of Example 13, the product

is obtained.

That which is claimed is:

1. A composition of matter suitable for forming improved molded articles comprising an aliphatically unsaturated polyester resin and $$CH_2=C(CH_3)COO(CH_2)_3Si(OCH_3)_3$$

in amount of from .05 to 5 percent based on the weight of the polyester resin.

References Cited

UNITED STATES PATENTS

| 2,823,218 | 2/1958 | Speier et al. | 260—827 |
| 2,922,806 | 1/1960 | Merker | 260—448.2 |
| 3,062,242 | 11/1962 | Vanderbilt | 260—827 |
| 3,084,436 | 4/1963 | Landry | 260—827 |

OTHER REFERENCES

Andrianov et al.: "Izvestia Akad. Nauk SSSR, Otdel Khim Nauk," 1957, pp. 459–65 (Q4 A5) (51 Chem. Abstracts 15,457).

Plueddemann et al.: "Modern Plastics," vol. 39, 8/62, pp. 135, 137, 138, 140, 144, 146, 187, 189, 191 and 193 (TP986 A1M6).

GEORGE F. LESMES *Primary Examiner.*

S. H. BLECH, *Examiner.*